United States Patent Office 3,368,887
Patented Feb. 13, 1968

3,368,887
CONSUMABLE WIRE FOR IMPROVING MECHANICAL PROPERTIES OF WELD METAL
Allan Enis, Clark, N.J., Clarence E. Jackson, Worthington, Ohio, and Arthur R. Lytle, Bethesda, Md., assignors to Union Carbide Corporation, a corporation of New York
No Drawing. Filed Aug. 17, 1965, Ser. No. 480,516
6 Claims. (Cl. 75—128)

This invention relates to a method for improving yield strength while at least maintaining impact properties in welding low alloy high strength notch-tough steels. In particular, this invention relates to such a method and consumable filler wires which provide improved yield strength while at least maintaining impact properties.

The art of welding wire development by nature proceeds along empirical lines wherein ingredients such as carbon, nickel, manganese, chromium, molybdenum and cobalt are used in varying amount to give desired mechanical properties in the weld metal while providing good weldability. This is especially true when developing wires for welding the relatively new low alloy high yield notch-tough steels.

A minimum 80,000 yield strength low-alloy steel would have an analysis within the following approximate ranges: 0.18% maximum carbon (C); 0.10% to 0.40% manganese (Mn); 1.00% to 1.80% chromium (Cr); 2.00% to 3.25% nickel (Ni); 0.20% to 0.60% molybdenum (Mo); 0.15% to 0.35% silicon (Si); 0.025% maximum phosphorus (P); 0.025% maximum sulfur (S); and the balance iron.

A minimum 130,000 to 150,000 yield strength low-alloy steel would have approximately the following typical analysis: 0.12% C, 1.0% Mn, 0.25% Si, 5.0% Ni, 0.50% Cr, 0.50% Mo, 0.07% V and the balance iron.

These steels have been developed to exhibit good impact properties even at low temperatures while maintaining high yield strengths. The design of steels is relatively straight forward. By selecting chemical compositions, steel making practice, and heat treatment, a good combination of toughness and strength can be readily achieved. This same flexibility does not exist in making welds. Weld properties are essentially as quenched with very little heat treating being performed to improve properties. Thus welding wires must be designed to achieve the properties desired in the as-welded condition. This has been a difficult problem in the art of developing welding wires.

Up until now, most of the elements used in wire chemistry benefited weld strength while being harmful to impact properties. For example, while carbon is a known strengthener in steel, it has a drastically harmful effect on impact properties as well as decreasing resistance to cracking of the weld metal.

We have unexpectedly discovered that tantalum added to the weld metal in amount of from about .005 to 0.20 increases yield strength while at least maintaining impact properties of the weld metal.

Accordingly, it is a main object of the invention to provide a method for electric arc welding low alloy high yield notch-tough steels wherein improved yield strength is obtained without any harmful effect on impact properties.

Another object is to provide a welding wire for electric arc welding low alloy high yield notch-tough steels wherein yield strength of the weld metal is improved by additions of tantalum to the welding wire.

A further object is to provide a consumable welding wire electrode for gas-shielded metal arc welding wherein tantalum is added to the consumable wire electrode in the range of from about .005 to about 0.20 weight percent.

According to the present invention, there is provided a method for increasing the yield strength of weld metal as deposited on high yield notch-tough steels from a consumable steel wire wherein tantalum is added to the weld metal in an amount sufficient to achieve the increased yield strength without essentially decreasing the impact properties of the weld metal.

In another aspect of the invention, there is provided a consumable steel wire containing at least one alloying element taken from the class consisting of nickel, manganese, chromium, molybdenum and cobalt for use in the electric arc welding of low alloy high yield notch-tough steel which wire contains .005 to about 0.20 percent by weight tantalum.

Tantalum has been used before to improve the properties of some steels of late, for example, chromium-copper-nickel steels. The prior art suggests that columbium could be used as an alternative for achieving the improved properties of steel. We have found that tantalum when added in specified ranges to a weld wire which is consumed and forms weld metal, unexpectedly improved yield strength while maintaining impact properties. On the other hand, columbium, which up until now has been considered the equivalent of tantalum for improving properties of steel plate, will have a disastrous effect on impact properties of weld metal from room temperature down to −100° F.

While the inventive concept will be described in the preferred embodiment with reference to welding wires containing tantalum, it is possible that the tantalum could be added to the weld metal from another source such as for example from a welding composition.

The following Table I gives the permissible and preferred ranges in weight percent of the chemical composition of wires contemplated by the invention.

TABLE 1

|  | Permissible | Preferred |
| --- | --- | --- |
| C | <.30 | .04–.16 |
| Mn | .1–2.5 | 1.25–1.80 |
| Ni | 1–12 | 1.50–3.00 |
| Mo | .05–1.5 | 0.20–1.25 |
| Cr | .05–1.5 | 0.4–.80 |
| Co | up to 4 |  |
| Si | .6 max. | 0.2–0.6 |
| Ta | .005–0.20 | .005–0.20 |
| Cu |  | Up to 1.00 |
| Ti |  | Up to 0.05 |
| Zr |  | Up to 0.05 |
| Al |  | Up to 0.05 |
| V |  | Up to 0.05 |
| S |  | Up to 0.015 max. |
| P |  | Up to 0.015 max. |
| Balance Iron |  |  |

The carbon content is specified as being less than .30 since some carbon must be present in steel but for purposes of this invention the carbon content of the wire should be less than .30.

The term "up to" indicates that if that ingredient is added it should not be added in greater amounts than that specified.

The term "max" indicates that the ingredient is usually present but that its presence should not exceed the amount specified.

It is well known that factors other than wire composition affect the weld results obtained. For example, shielding gas, current density and wire diameter, are a few of the parameters involved. The data, herein, are provided so that a person with ordinary skill in the art will understand the invention and how best to practice such invention to achieve the results described.

The concept of the invention is limited to steel wires which are alloyed with at least one alloying element such as nickel, chromium, manganese, molybdenum and cobalt. Usually in order to achieve the proper balance of strength and toughness in the weld joint the metallic ingredients are proportioned among several elements especially nickel, chromium, manganese and molybdenum. When the wire is to be used for gas-shielded metal arc welding, silicon is also added as a deoxidizer.

The discovery of the unexpected affect tantalum has on the weld deposit properties was made during tests performed on butt joints having a 45 deg. included angle in two pieces of steel of the type contemplated by this invention. The abutting edges of the workpieces were purposely spaced a considerable distance apart to remove any doubt as to possible influences from detection or pick up of elements or metals from the base plate. The test specimens were dissected from the middle portion of the weld. This is standard procedure for evaluating the performance of the weld metal.

Wires A through C in Table II herein were used in the above-mentioned tests. The welding conditions were substantially the same for each wire test. The arc current was 355 amps. Arc voltage 23½ volts direct current reverse polarity. The wire size was 3/32 in. dia. Shielding gas was argon+2% $O_2$ at 50 c.f.h. Travel speed was 14 i.p.m. Preheat temperature was 150° F. Interpass temperature was 200° F. The mechanical properties are summarized in Table III.

TABLE II

| Wire | Yield Strength | | | | | | | | |
|---|---|---|---|---|---|---|---|---|---|
| | 100 p.s.i. | | 120 p.s.i. | | 130 p.s.i. | | 140 p.s.i. | | 150 p.s.i. |
| | A | B | C | D | E | F | G | H | I |
| Element: | | | | | | | | | |
| C | 0.059 | 0.061 | 0.064 | 0.08 | 0.09 | 0.15 | 0.12 | 0.14 | 0.11 |
| S | 0.009 | 0.006 | 0.010 | 0.007 | 0.007 | 0.007 | 0.007 | 0.004 | 0.004 |
| P | | | | 0.003 | 0.003 | 0.004 | 0.006 | 0.009 | 0.004 |
| Mn | 1.47 | 1.53 | 1.40 | 1.50 | 1.55 | 1.45 | 1.25 | 1.53 | 1.70 |
| Si | 0.16 | 0.14 | 0.19 | 0.25 | 0.25 | 0.30 | 0.30 | 0.25 | 0.35 |
| Ni | 1.77 | 1.75 | 1.74 | 2.50 | 2.20 | 2.50 | 2.75 | 2.90 | 2.50 |
| Mo | 0.32 | 0.34 | 0.28 | 0.50 | 0.55 | 0.50 | 0.85 | 0.85 | 0.85 |
| Cr | 0.15 | 0.15 | 0.15 | 0.40 | 0.40 | 0.40 | 0.55 | 0.45 | 0.60 |
| Cu | 0.17 | 0.19 | 0.15 | 0.45 | 0.45 | 0.50 | 0.10 | 0.10 | 0.20 |
| V | | | | 0.02 | 0.02 | 0.01 | 0.01 | 0.01 | 0.02 |
| Al | 0.011 | 0.023 | 0.03 | 0.01 | 0.01 | 0.01 | 0.03 | 0.02 | Trace |
| Ti | 0.036 | 0.030 | 0.04 | 0.001 | 0.01 | 0.01 | 0.01 | 0.004 | Trace |
| Zr | 0.01 | 0.01 | 0.02 | 0.01 | 0.02 | 0.02 | 0.03 | 0.005 | Trace |
| Ta | 0.014 | 0.032 | 0.078 | 0.015 | 0.015 | 0.015 | 0.015 | 0.015 | 0.02 |
| $N_2$ | | | | 0.005 | 0.006 | 0.004 | 0.005 | 0.005 | |
| $O_2$ | | | | | | | | 0.003 | |
| $H_2$ | | | | | | | | 0.002 | |
| Balance Iron | | | | | | | | | |

TABLE III

| Wire | Y.S. (k.s.i.) | U.T.S. (k.s.i.) | Percent Elong. in 2 in. | Percent R.A. | Charpy "V" Notch Impact Strength (ft. lbs.) | | | |
|---|---|---|---|---|---|---|---|---|
| | | | | | 0° F. | −60° F. | −80° F. | −100° F. |
| A | 102.5 | 108.2 | 19.6 | 68.8 | | (1) 111 | (3) 103 | (5) 85 |
| | 103.2 | 108.7 | 17.1 | 52.4 | | (2) 105 | (4) 96 | (6) 93 |
| B | 105.1 | 111.1 | 18.9 | 68.1 | | (1) 99 | (3) 64 | (5) 61 |
| | 105.6 | 111.0 | 19.0 | 69.0 | | (2) 87 | (4) 91 | (6) 65 |
| C | 114.0 | 118.0 | 19.0 | 65.4 | 71 | (1) 46 | | (3) 13 |
| | 112.0 | 117.0 | 17.7 | 62.4 | 72 | (2) 48 | | (4) 11.5 |

Other wires were made with columbium instead of tantalum added to the wire. Table IV summarizes these wire chemistries.

TABLE IV

| Wire | Composition, Percent | | | | | | | | | | | | | |
|---|---|---|---|---|---|---|---|---|---|---|---|---|---|---|
| | Cr. | Mn. | Mo. | Cu. | Ni. | Zr. | Cb. | Ta. | Al. | Ti. | Si. | S. | C. | Co. |
| 1 | 0.15 | 1.33 | 0.31 | 0.15 | 1.72 | 0.01 | 0.025 | | 0.018 | 0.030 | 0.13 | 0.016 | 0.061 | |
| 2 | 0.15 | 1.52 | 0.34 | 0.19 | 1.80 | 0.03 | 0.066 | | 0.017 | 0.034 | 0.15 | 0.012 | 0.065 | |
| 3 | 0.15 | 1.55 | 0.36 | 0.17 | 1.82 | 0.01 | 0.13 | | 0.039 | 0.037 | 0.16 | 0.013 | 0.063 | |

These wires were tested under the same conditions given above for wires A–C. The mechanical properties are given in Table V.

TABLE V

| Wire | Y.S. (k.s.i.) | U.T.S. (k.s.i.) | Percent Elong. in 2 in. | Percent R.A. | Room | Charpy "V" Notch Impact Strength (ft. lbs.) | | | |
|---|---|---|---|---|---|---|---|---|---|
| | | | | | | 0° F. | −60° F. | −80° F. | −100° F. |
| 1 | 112.6 | 117.8 | 19.8 | 66.8 | (5) 77 | | (1) 13 | (3) 7 | |
| | 112.6 | 116.4 | 17.3 | 56.3 | (6) 74 | | (2) 14 | (4) 11 | |
| 2 | 115.0 | 120.0 | 17.4 | 64.2 | (5) 77 | (3) 46 | (1) 27.5 | | |
| | 116.0 | 120.8 | 17.4 | 64.0 | (6) 73 | (4) 52 | (2) 12.5 | | |
| 3 | 118.0 | 123.7 | 17.5 | 62.0 | (5) 60 | (3) 34 | (1) 11.5 | | |
| | 118.0 | 123.4 | 18.4 | 64.0 | (6) 63 | (4) 42 | (2) 11.5 | | |

From the above data, it can be seen that contrary to what one would expect columbium does not have the same beneficial affect on impact properties at low temperatures as does tantalum.

Other wires similar to wires A through C in Table II can be made to weld high strength materials. Typical wire compositions for these wires are given in Table II and are identified as wires D through I. Each of the wire chemistries include about .015 tantalum.

In further investigations two wires with essentially the same wire chemistries except for varying amounts of tantalum were made. See Table VI. Both wires contained 0.012 or 120 p.p.m. nitrogen. This is a moderate amount of nitrogen as compared with wires D through H in Table II for example.

The wires were weld tested under conditions similar to that given for wires A–C. The mechanical properties are given in Table VII. The weld made with the wire containing 0.014 tantalum had higher impact values at −60° F. and −100° F. In addition this wire, although containing a point less carbon, resulted in welds with higher yield strengths (about 2–3,000 p.s.i.).

It can be deduced from this data that in the presence of moderate nitrogen, a small amount of tantalum will allow the weld metal to tolerate the higher nitrogen content. This is extremely valuable since it is difficult to lower nitrogen content.

TABLE VI

|     | Wire 1 | Wire 2 |
| --- | --- | --- |
| C   | 0.05 | 0.04 |
| Mn  | 1.60 | 1.55 |
| Si  | 0.30 | 0.32 |
| Ni  | 1.55 | 1.43 |
| Mo  | 0.24 | 0.21 |
| Cr  | 0.08 | 0.08 |
| Cu  | 0.35 | 0.35 |
| Ti  | 0.018 | 0.011 |
| Al  | 0.020 | 0.015 |
| Zr  | 0.015 | 0.017 |
| Ta  | 0.009 | 0.014 |
| $N_2$ | [1] 0.012 | [1] 0.012 |

[1] 120 p.p.m.

TABLE VII

| | Weld Properties | | Charpy "V" Notch Impact (Ft. lbs.) | | |
| --- | --- | --- | --- | --- | --- |
| | Y.S. (p.s.i.) | UTS (p.s.i.) | 0° F. | −60° F. | −100° F. |
| (1) | 96,400 | 103,300 | | | |
| (1) | 94,700 | 102,200 | 159, 167 (Avg. 163) | 48, 102 (Avg. 75) | 20, 27 (Avg. 23) |
| (2) | 98,200 | 101,700 | | | |
| (2) | 98,000 | 101,200 | 155, 168 (Avg. 161) | 128, 145 (Avg. 136) | 34, 38 (Avg. 36) |

While the invention has been described with reference to certain preferred embodiments, it should be understood that certain variations in the combinations of ingredients in a wire composition can be made without departing from the spirit and scope of the invention.

What is claimed is:

1. A consumable ferritic wire consisting essentially of less than 0.30% C, 0.1 to 2.5% Mn, 1 to 12% Ni, 0.05 to 1.5% Mo, 0.05 to 1.5% Cr, up to 4% Co, 0.6% max. Si, 0.005 to 0.20% Ta and the balance iron.

2. A consumable ferritic wire consisting essentially of from about 0.04 to 0.16% C, 1.25 to 1.80% Mn, 1.50 to 3.00% Ni, 0.20 to 1.25% Mo, 0.4 to 0.80% Cr, 0.2 to 0.6% Si, 0.005 to 0.20% Ta, up to 1.00% Cu, up to 0.05% Ti, up to 0.05% Zr, up to 0.05% Al, up to 0.05% V, up to 0.015% max. S, up to 0.015% max. P and the balance iron.

3. A consumable ferritic wire consisting essentially of about 0.11% C, 0.004% S, 0.004% P, 1.70% Mn, 0.35% Si, 2.50% Ni, 0.85% Mo, 0.60% Cr, 0.20% Cu, 0.02% V, trace of Al, trace of Zr, trace of Ti, 0.02% Ta and the balance iron.

4. A consumable ferritic wire consisting essentially of about 0.059% C, 0.009% S, 1.47% Mn, 0.16% Si, 1.77% Ni, 0.32% Mo, 0.15% Cr, 0.17% Cu, 0.021% Al, 0.036% Ti, 0.01% Zr, 0.014% Ta and the balance iron.

5. A consumable ferritic wire consisting essentially of about 0.08% C, 0.007% S, 0.003% P, 1.50 Mn, 0.25% Si, 2.50% Ni, 0.50% Mo, 0.40% Cr, 0.45% Cu, 0.02% V, 0.01% Al, 0.001% Ti, 0.01% Zr, 0.015% Ta, 0.005% $N_2$ and the balance iron.

6. A consumable ferritic wire consisting essentially of about 0.12% C, 0.007% S, 0.006% P, 1.25 Mn, 0.30% Si, 2.75% Ni, 0.85% Mo, 0.55% Cr, 0.10% Cu, 0.01% V, 0.03% Al, 0.01% Ti, 0.03% Zr, 0.015% Ta, 0.005% $N_2$ and the balance iron.

References Cited

UNITED STATES PATENTS

| | | | |
| --- | --- | --- | --- |
| 2,356,822 | 8/1944 | Chyle | 219—137 X |
| 2,810,818 | 10/1957 | Rothschild | 219—137 |
| 2,913,814 | 11/1959 | Muller | 75—128 X |
| 2,913,815 | 11/1959 | Muller | 75—128 X |
| 3,097,294 | 7/1963 | Kubb. | |
| 3,115,406 | 12/1963 | Ballass | 75—124 |
| 3,139,508 | 6/1964 | Freeman | 219—137 X |
| 3,162,751 | 12/1964 | Robbins. | |
| 3,177,339 | 4/1965 | Scheruhn | 219—137 |
| 3,195,230 | 7/1965 | Peck | 219—145 X |
| 3,215,814 | 11/1965 | Dorschu | 219—145 |

DAVID L. RECK, *Primary Examiner.*

P. WEINSTEIN, *Assistant Examiner.*